United States Patent

Salisbury et al.

[15] 3,636,323
[45] Jan. 18, 1972

[54] GEOGRAPHIC POSITION LOCATOR

[72] Inventors: John D. Salisbury, Livermore; Marvin R. Gustavson, Danville, both of Calif.; John S. Foster, Falls Church, Va.

[73] Assignee: The United States of America as represented by the United States Atomic Energy Commission

[22] Filed: May 1, 1970

[21] Appl. No.: 33,803

[52] U.S. Cl. .................. 235/150.25, 235/61.5 E, 235/150.2, 340/220, 340/420, 340/421, 343/5 MM
[51] Int. Cl. .......................................... G06f 15/50
[58] Field of Search ......................... 235/150.2, 150.25, 61.5; 244/3.16, 3.18; 340/220, 420, 421; 343/5 MM

[56] References Cited

UNITED STATES PATENTS 2,996,137  8/1961  Chu et al. .................... 235/150.2 UX

Primary Examiner—Malcolm A. Morrison
Assistant Examiner—R. Stephen Dildine, Jr.
Attorney—Roland A. Anderson

[57] ABSTRACT

A system and method for tracking its own geographic position, comparing that position with stored boundary data, i.e., a "map," and responding whenever the apparatus crosses the boundary as defined on the "map." In operation, inertial measurements are processed to produce signals representative of computed position. These signals are compared with stored positional data, whereupon a response mechanism may be activated. The system includes a means for determining its motion state so that the system can calibrate itself when there is no significant motion. Thus, the system offers new options for the use of conventional as well as nuclear weapons, as well as for other type of vehicle position determination.

9 Claims, 4 Drawing Figures

INVENTORS.
John D. Salisbury
Marvin R. Gustavson
John S. Foster

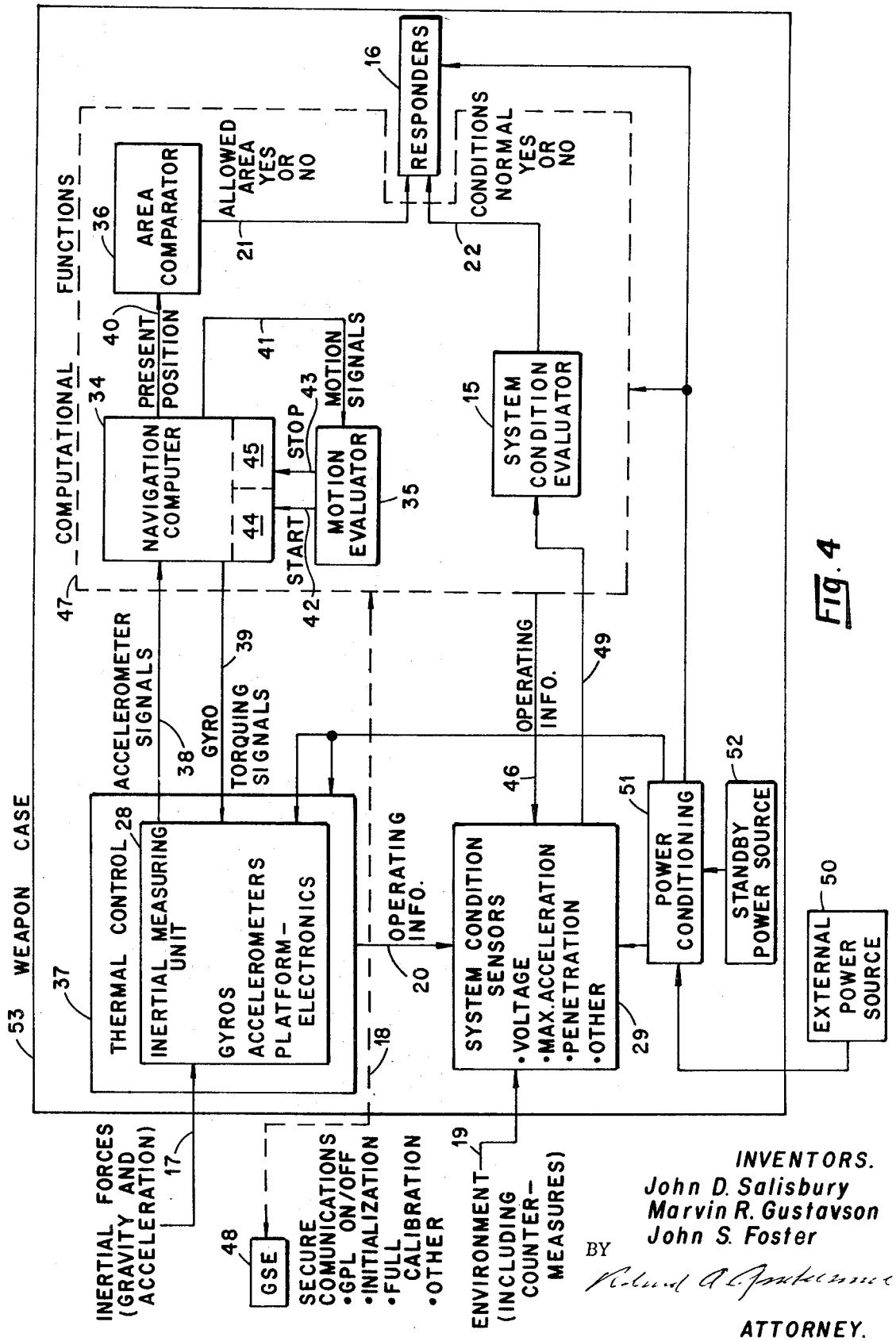

3,636,323

GEOGRAPHIC POSITION LOCATOR

BACKGROUND OF THE INVENTION

The invention described herein was made in the course of, or under, Contract No. W-7405-Eng-48, with the U.S. Atomic Energy Commission.

The integrity and security of weapons, particularly nuclear weapons, has been and now is of paramount importance. To this end, elaborate security precautions are taken wherever weapons are made or stored. For enhanced security or other reasons which might increase its usefulness, it would be desirable to have a weapon which would cooperate toward its own protection or manner of use in a selective manner; that is, to have an "intelligent" weapon which could respond, e.g., by disabling itself, when tampered with, and/or selectively respond in some other useful way to its own geographic position.

SUMMARY OF THE INVENTION

The present invention provides a system and method which enables a weapon or other vehicle to have the above-described "intelligence," in that it provides for tracking or determining its own geographic position, comparing that position with stored boundary data, i.e., a "map," and responding whenever the apparatus crosses the boundary as defined on the "map." The "map" is a description of the boundary of a selected geographic area which is usable by the system. In addition the system includes the novel feature of determining its motion state so that the system can calibrate itself when there is no significant motion. Also, the system includes features for detecting extreme environmental and abnormal system conditions and for protection from external tampering but allowing access thereto by authorized personnel.

Therefore, it is an object of this invention to provide a geographic position locator for a weapon or vehicle attached thereto.

A further object of the invention is to provide a system and method capable of determining its own geographic location and respond in accordance therewith.

Another object of the invention is to provide a system and method capable of using inertial measurements to produce signals representative of a computed position, these signals being compared with stored positional data, whereupon a response mechanism is activated in accordance therewith.

Another object of the invention is to provide a system for self-determination of its geographic position which is immune from unauthorized tampering.

Other objects of the invention will become readily apparent from the following description and accompanying drawings.

BRIEF DESCRIPTION OF THE DRAWINGS

FIG. 4 is a functional diagram of an embodiment of the overall system.

DESCRIPTION OF THE INVENTION

Prior to the description of the inventive system, it is pointed out that an important aspect of the geographic position locator (GPL) system is that it uses a type of inertial navigation. It is not important that the specific type be described to understand the concept. Thus a stabilized, north pointing inertial navigation system (INS) is just one mechanization of several that could be used including "strap-down" types. What makes the GPL system unique is the way in which the INS is used, the advantage taken of motionless periods, the "map," etc. The fact that it uses gyros and accelerometers and has temperature control is not unique but is part of the INS used in the GPL system.

Figure 1:
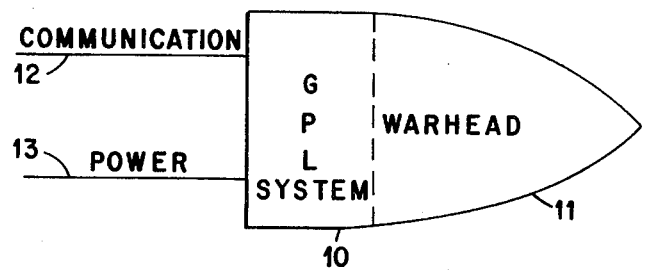
FIG. 1 diagrammatically illustrates the inventive geographic position locator system operatively mounted inside a warhead.

The inventive geographic position locator (GPL) system and method, shown schematically in FIG. 1 and indicated generally at 10, permits constraints to be exercised over the geographic location in which a warhead 11 of either a conventional or nuclear weapon can be used. The GPL system is provided with communication and power inputs, as indicated at 12 and 13, respectively. These constraints are accomplished by comparing computed positions with predetermined allowable positions, as described hereinafter. The system can decide whether or not the weapon should be in an enabled (i.e., usable) state. Potentially the system represents a capability for enhancing safety, effectiveness, invulnerability and command and control characteristics.

The inventive GPL system has three fundamental requirement capabilities:

1. It is capable of exercising a positive area constraint upon the use of the nuclear or conventional weapon containing it.
2. It is highly insensitive to accidentally or intentionally imposed environments.
3. Its physical and logistic characteristics are consistent with the operational uses to which the weapon will be put.

Figure 2:
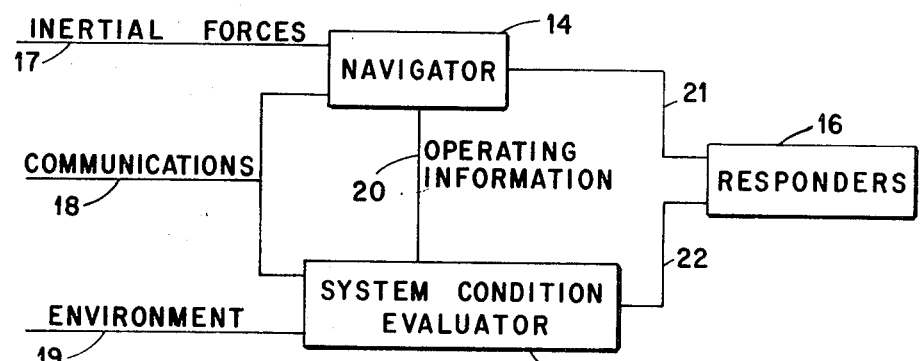
FIG. 2 is a functional basic block diagram of the inventive system.

The requirement capabilities of the inventive system are shown in FIG. 2. Basically, the system is composed of three major components or subsystem comprising a navigator 14, a system condition evaluator 15, and responders 16. While each of these basic components will be discussed in greater detail hereinafter, brief statements of their functions are as follows:

1. The navigator 14 is an inertial navigation system which receives inputs indicated as inertial forces 17 and communications 18, and computes the weapon's location, compares it with stored information regarding allowed locations, and decides whether or not the weapon should be in an enabled state. It also carries out certain internal error-minimizing procedures when the weapon is motionless.

2. The system condition evaluator 15 receives inputs indicated as communications 18, environment 19, and operating information 20, and identifies when the GPL system is malfunctioning or when extreme environments (i.e., outside the design range) are encountered.

3. The responders 16 respond to output signals 21 from the navigator 14 and to output signals 22 from the system condition evaluator 15 and places the weapon in a usable or an unusable state.

Figure 3:
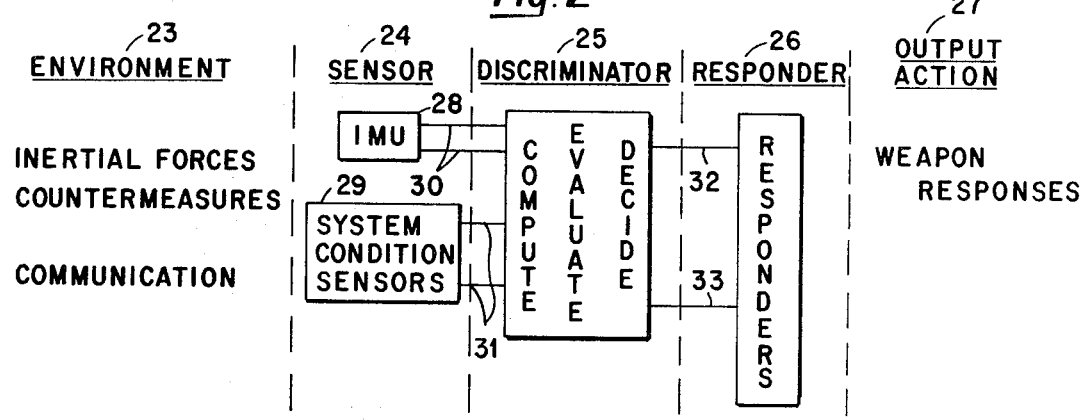
FIG. 3 is a diagrammatic illustration of the inventive system as an "intelligent" mechanism.

Several basic features characterize the inventive GPL system as an "intelligent" mechanism in that in a completely self-determined fashion, it senses its environment, evaluates the information, and provides an appropriate output action. The system is depicted in FIG. 3 as being composed of five sections or areas of effect; namely, environment 23, sensor 24, discriminator 25, responder 26, and output action 27. The environment 23 composed, for example, of inertial forces, countermeasures and communications, is sensed by sensor 24 composed of an inertial measuring unit (IMU) 28 and system condition evaluation sensors 29. The outputs 30 and 31 from IMU 28 and sensors 29, respectively, are directed to the discriminator 25 which initiates outputs 32 and 33 to responder 26 based upon computational functions that evaluate the sensed information, and make decisions accordingly, The responder 26 produces the desired output action 27 comprising weapon responses which enable, disenable, or otherwise suitably affect the weapon warhead.

The basic components of the system shown in FIG. 2 and the elemental characteristics illustrated in FIG. 3 are combined and expended in greater detail in FIG. 4, which shows the functional interrelationships between the subsystems or components of the inventive GPL system. Inasmuch as the invention is directed to the overall system, detailed description of the various components is deemed unnecessary and is not included for purposes of simplicity since a description of the structure and the electronics of the various components would be extensive.

AS shown in FIG. 4, the navigator 14 of FIG. 2 includes the inertial measuring unit (IMU) 28, a navigation computer 34, motion evaluator 35, and an area comparator 36. The system condition evaluator 15 of FIG. 2 includes in FIG. 4 the system condition sensors 29 comprising appropriate sensors for measuring such items as power supply voltage, maximum acceleration, penetration, and the necessary computational functions to evaluate the sensed information and form an output decision, as described hereinbelow.

The IMU 28 contains gyros and accelerometers mounted on a stabilized platform, decoupled for vehicle rotational motion by a gimbal system, the accelerometers measuring $x$, $y$, $z$ coordinate motion and the gyros stabilizing the accelerometer platform. Also included in the IMU is the associated electronic circuitry to servocontrol the gimbals. The inertial forces 17, gravity and acceleration, are inputs into the IMU 28 with the IMU being mounted in a thermal control system 37 which maintains precise temperature control over the inertial components to ensure high performance. The output from the IMU 28 is a signal representing the gross motion of the entire system. The gross motion signal includes local earth motions, random and nonrandom vibrations and net displacement. If desired, a degree of temperature control over the computer electronics may be provided. The navigation computer 34 uses accelerometer signals 38 (gross motion) from IMU 28 to compute the present position of the system, be it mounted on a weapon or other vehicle, and to command the platform in the IMU 28 via gyro-torquing signals 39 to the local horizontal by torquing the gyros within the IMU. The computed or present position of the vehicle is directed to area comparator 36 via signals 40 and is compared to the allowable coordinates stored in the memory of the comparator, and an output decision (allowed area-yes-or-no) is formed, as indicated by signal 21 to responders 16, either permitting or denying the use of the associated weapon. The navigator's normal, unpredictable position error accumulates with the time it spends navigating. The motion evaluator 35 improves the system's position determination. The motion evaluator 35 performs a crucial function. It analyzes the gross motion signal 41, characterizing the component vibrations, analyzing the total accelerometer signal 38 to determine if a net acceleration exists sufficient to integrate into a meaningful displacement. The signals which do not represent net displacement tend to form a background or noise component of the total motion which complicates the action of the motion evaluator. Thus the system detects when the vehicle has ceased or is starting to move and takes advantage of motionless periods to prevent the growth of position error during these intervals by stopping the continuous computation of position. Also, the GPL system can perform a partial calibration procedure which reduces the error in latitude and also reduces the rate at which the longitude error increases. These functions are accomplished by motion signals indicated at 41 being directed from navigation computer 34 to motion evaluator 35 with start motion signals 42 or stop motion signals 43 being directed from evaluator 35 respectively to navigation computer 34 functions or sections indicated as navigation mode 44 and partial calibration mode 45. If the gross motion signal 41 as processed by the motion evaluator 35 indicates no significant net motion, the system will calibrate itself through the partial calibration mode 45. However, if significant net motion is present as indicated by evaluator 35, the system will not calibrate itself, but will revert to the navigate mode 44.

The system condition sensors 29 receive as inputs: environment signals 19, which include countermeasures, operating information 20 from the IMU 28, and operating information 46 from the computation functions indicated by dotted line 47 which encompasses computation information from navigation computer 34, motion evaluator 35, area comparator 36 and system condition evaluator 15. Communication signals 18 from an external control by ground support equipment (GSE) 48 are incorporated into he computational functions 47, these signals including system on/off, initialization, full calibration, etc. The output from system condition sensors 29, as indicated at 49, is directed into the system condition evaluator 15 with the output signals 22 (conditions normal-yes-or-no) therefrom being directed to responders 16, permitting, denying or activating some other response in the use of the associated weapon. The system condition evaluator 15 thus detects improper functioning and/or forcing of the GPL system, and detects environmental extremes.

A primary power source 50 is located externally; although it may be desirable to have the system completely self-contained, provided power sources are available which will deliver suitable amounts of energy and which are sufficiently small to be utilized. As indicated, the power from source 50 is directed to an internally located power conditioning assembly 51 wherein the power is conditioned and distributed as necessary to the components of the GPL system, as indicated by the various lead lines. A standby power source 52 is operatively connected to power-conditioning assembly 51 and powers the system during any short interruptions of the main power source 50 that might occur. The power supply voltage is internally monitored to permit locating the main power source external to the weapon and still maintain a fail-safe condition. In addition other variables may be monitored to prevent the possibility of countermeasures which would intentionally exceed the system's capabilities.

The entire system except for the GSE 48 and power source 50 is enclosed in a weapon case or membrane 53 which will provide the GPL system 10 with protection from external tampering, as well as surround the critical portions of the warhead 11 of FIG. 1. Penetration of the case or membrane 53 will be detected by the penetration sensor of the system condition sensors 29; so that if the membrane integrity was disrupted in an unauthorized effort to gain access to the system or warhead, an appropriate response would be triggered the deny the use of the weapon. However, access to the enclosure would be available to authorized personnel through a coded switch mechanism operatively connected to the penetration sensor.

While not shown except by legend various pieces of ground support equipment (GSE) 48 are required at various times to turn the GPL system on an off to manually insert the correct position information prior to starting the mission (and at intervals thereafter to keep the error accumulation to within acceptable limits), and to perform a full calibration of the system whenever operational experience indicates it is desirable to do so. The GSE functions can only be applied to the GPL system by authorized persons.

The modes in which the GPL system functions provide further insight into the interrelationships between the subsystems or basic components and their roles in the system. Ten modes are described individually as follows:

1. Navigate—In this mode the section 44 of the navigation computer 34 carries out those operations necessary to normal navigation and together with area comparator 36 determines whether or not the location of the weapon is in a prescribed region.

2. Partial Calibrate—The section 45 of the navigation computer 34 carries out a set of operations which partially identify and correct the navigation system errors that accumulate during the navigate mode. This mode is performed only during periods of vehicle rest. It is a completely automatic and self-contained operation. This mode may be interrupted at any time and the system switched to the navigate mode.

3. Motion Evaluate—The motion evaluator 35 determines if it has either ceased or started to move. This mode is used to control transitions between the navigate and partial calibrate modes.

4. Calibrate—In this mode the gyros are fully recalibrated by equipment external to the GPL system such as the GSE 48. The procedure is more complex, and requires more time to accomplish than the partial calibrate mode.

5. Initialize—This mode provides for the input of external position (and possible velocity) data from the GSE 48, for example. The navigator 14 of the system requires an initial position "fix" to be inserted manually prior to operational use, and then at appropriate intervals thereafter to keep the error accumulated during the navigate mode to within operationally acceptable limits.

6. Map Initialize—This mode provides for the input of the data to the area comparator 36 which defines the prescribed area of operation.

7. Response—In this mode, the system responder 16 is activated and the predetermined action is effected. The response mode is entered into when the weapon is used in such a way as to violate a preset condition (e.g., entering a forbidden area).

8. Condition Evaluate—This mode detects whether improper functioning and/or misuse of the GPL system is occurring and is accomplished through the system condition evaluator 15. It includes features aimed at nullifying threats to the system.

9. GPL Off—All portions of the GPL system are turned off in proper sequence. The response mode is not activated.

10. GPL On—All portions of the GPL system are activated in proper sequence.

The inventive GPL system and method can thus be used to provide a location criterion for weapon use. The inertial navigation component or subsystem thereof will compute position and compare it to stored knowledge of where the weapon is supposed to be used. The system includes other components or subsystems which allow it to carry out its job effectively.

The embodiment illustrated in FIG. 4 may, if desired, be modified by transmitting the motion signals 41, being fed to motion evaluator 35, directly from the inertial measuring unit 28 to evaluator 35 without passing same through the navigation computer 34.

It has thus been shown that the present invention provides a system and method for tracking or determining its own geographic position, comparing that position with stored boundary data, i.e., a "map," and responding whenever the system crosses the boundary as defined on the "map," the response, for example, where the system is attached to a nuclear warhead, being to disenable the warhead if it crosses into an unauthorized area. In addition, means is provided to detect unauthorized penetration of the system. Thus, the integrity and security of weapons, either conventional or nuclear, is greatly advanced.

While a particular embodiment of the invention has been illustrated and described, modifications will become apparent to those skilled in the art, and it is intended to cover in the appended claims all such modifications as come within the spirit and scope of the invention.

What we claim is:

1. A geographic position locator system comprising: means for determining the system's geographic position including means for evaluating motion thereof; means for comparing the determined position with stored boundary data; means for determining the condition of the system; means responding to output signals from said comparing means and said condition determining means for effecting the condition of an associated vehicle; mean for providing the necessary power distribution from an associated power source throughout the system; said first-mentioned means comprising an inertial measuring means for determining at least gravity and acceleration forces, a navigation computer means connected to receive at least acceleration output signals from said inertial measuring means and for directing at least gyro-torquing signals thereto; said means for evaluating motion comprising a motion evaluator connected to receive motion signals and connected to transmit to said navigation computer means signals defining start and stop motions.

2. The system defined in claim 1, wherein said navigation computer means includes a navigate mode and a partial calibration mode, and wherein said start and stop motion signals from said motion evaluator are respectively directed to said navigate mode and said partial calibration mode of said navigation computer means.

3. The system defined in claim 2, wherein said motion signals received by said motion evaluator are directed thereto from said navigation computer means.

4. The system defined in claim 3, wherein said means for comparing the determined position with stored boundary data comprises an area comparator means connected to receive a geographic position determination from said navigation computer means.

5. The system defined in claim 4, wherein said stored boundary data of said area comparator means includes at least a usable description of selected geographic areas.

6. The system defined in claim 1, wherein said means for determining the condition of the system includes system condition sensor means and a system condition evaluator means, said system condition sensor means being constructed to sense environment conditions and internal system conditions, and for directing an output of such sensed conditions to said system condition evaluator means.

7. The system defined in claim 1, wherein said means for providing the necessary power to the system includes at least an internal power source, and a power-conditioning means, said power-conditioning means being constructed to receive power from at least said internal power source and distribute the power as required throughout the system.

8. The system defined in claim 1, additionally including each of means encompassing tamper protection said before defined means of said system; and wherein said means for determining the condition of the system includes means for sensing unauthorized penetration of said system tamper protection-encompassing means.

9. The system defined in claim 1, including means for directing communications to said first-mentioned means and to said condition-determining means.

* * * * *